Dec. 30, 1930.  E. D. MOORE ET AL  1,786,717

TROLLEY SILENCER

Filed March 7, 1929

Inventors
EDGAR D. MOORE
FRED R. DIPPMAN
By
Attorney

Patented Dec. 30, 1930

1,786,717

UNITED STATES PATENT OFFICE

EDGAR D. MOORE AND FRED R. DIPPMAN, OF MANSFIELD, OHIO, ASSIGNORS TO THE OHIO BRASS COMPANY, OF MANSFIELD, OHIO, A CORPORATION OF NEW JERSEY

TROLLEY SILENCER

Application filed March 7, 1929. Serial No. 344,984.

Our invention relates to trolley pole construction used in connection with a moving vehicle for collecting current from a trolley wire.

The object of our invention is to provide a trolley pole having means associated therewith to prevent the noise and vibration created as the current collector moves along the trolley wire from being transmitted through the trolley pole to the roof of the car.

Our invention resides in the new and novel construction, combination and relation of the parts hereinafter described and shown in the accompanying drawing.

In the drawing:—

Figure 3:
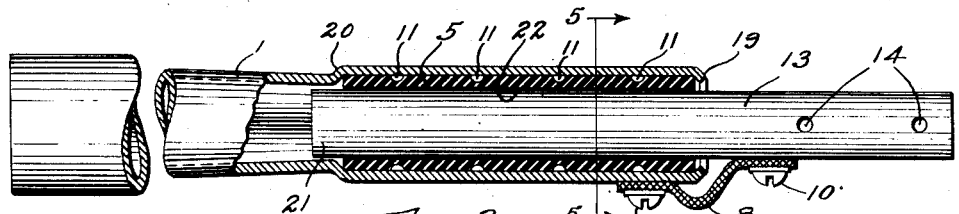
Fig. 3 is a form which can be readily adapted to present day trolley poles.
Figure 4:
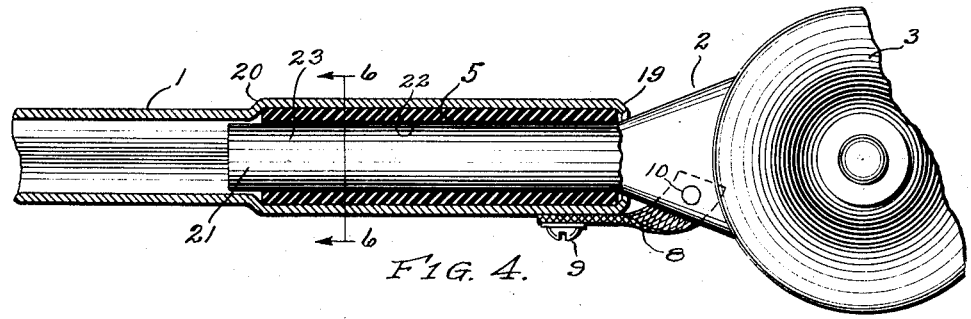
Fig. 4 is a modification of Fig. 1 in which the current collector is inserted within the pole in place of being mounted exterior thereof.
Figure 5:
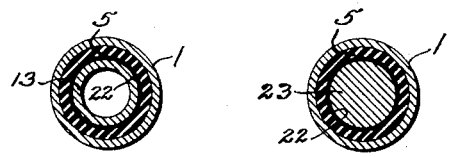
Figure 6:
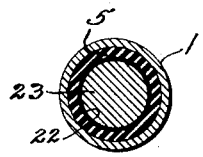

Figs. 5 and 6 are sectional views on the lines 5 and 6 of Figs. 3 and 4 respectively.

One of the great objections to the present day current collecting devices used on trolley cars is the noise set up between the collecting device and the trolley wire as the car moves and the current collector sets up a resonant condition as in the case of a bow when drawn across the strings of a violin and meets with obstructions, etc., on the wire. This noise and vibration is transmitted through the metal trolley pole to the roof of the car and the roof materially amplifies the noise and vibrations since the roof acts as a sounding board. This is extremely annoying to passengers and is to be avoided if possible, especially in connection with de luxe cars where the comfort of the passengers is given first consideration.

Our invention can be applied in various ways to a trolley pole of the present day construction and we show several ways of doing so.

Figure 1:
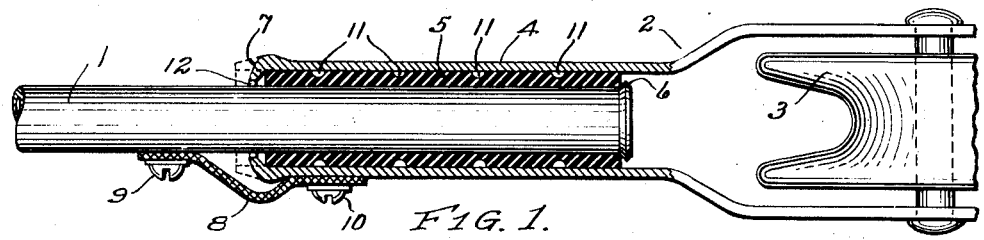
Fig. 1 is a view of our invention showing a trolley pole, current collector and an interposed silencing member.

In Fig. 1 is shown the upper end of a trolley pole 1 and a trolley harp 2 carrying a wheel 3 and a socket 4; interposed between the pole 1 and socket 4 is a material 5 which will sufficiently destroy the vibrations set up in the wires and prevent any transmission of the same from the socket 4 to the pole 1. This material is preferably a resilient or elastic composition such as rubber and this quite effectively destroys or dampens the vibration referred to.

As to the grade of rubber, this can vary materially depending upon the requirements and construction and may consist of car spring rubber or such grades as are used in automobile tires, clothes wringers, etc. which are yielding, deformable and resilient. Other materials may be used such as a loosely composed fibrous material similar to that known as Celotex, but we prefer the rubber compositions as they are more efficient and can be molded to any desired shape and size and will endure a long time in services, and it gives a yielding relation between the trolley pole and socket 4, which we find is quite beneficial in reducing the shock upon the trolley wire and wheel should the wheel strike obstructions along the wire.

In Fig. 1 the member 5 is mounted upon the end of the trolley pole and the end is then expanded as at 6 by driving a tapered tool into the end of the pole 1. The member 4 is made preferably of malleable or ductile material and is slipped over the resilient material 5 with a tight or friction fit therebetween and the end of the member 4 is then peened over as at 7, which effectively prevents the trolley harp 2 from being displaced. Prior to the end being bent over as at 7, the end of the member 4 projects as indicated by the dotted lines.

In order to conduct current from the harp 2 to the pole 1, the parts 1 and 4 are electrically connected by means of a member 8 held in electrical contact with the members 1 and 4 by means of the screws 9 and 10 respectively. The member 8 is preferably of woven copper, which we find will effectively conduct the current without conducting the sound set up in the member 2 and will also allow relative transverse movement of the members 1 and 4 due to the resilient member 5 yielding as the stress upon the parts increases or decreases.

If we employ a resilient material 5 which tends to resist quite strongly relative movement of the parts 1 and 4 due to its composition, we find that the elasticity may be increased by providing the member 5 with annular grooves 11. The amount of relative movement between the parts of 1 and 2 may be limited at the inner end of the member 4 by the width of space 12 between the members 1 and 7. This space 12 should be made sufficient, however, so that under normal operating conditions direct contact between the members 1 and 4 will be prevented, otherwise vibrations will be immediately carried from the member 4 to the member 1. We prefer to use no means of holding the parts together which will involve a direct metallic connection between the parts 1 and 4, thereby destroying the efficiency of the element 5 as a non-conductor of sound.

Figure 2:
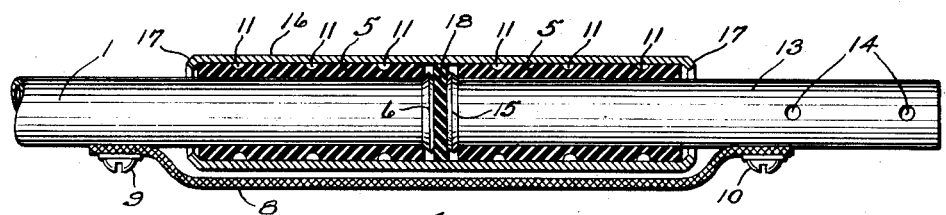
Fig. 2 is a modification of our invention.

Fig. 2 shows a form having a pole 1, the lower end of which is secured to a trolley roof through the medium of a trolley base, a stem 13 to the end of which is directly secured a trolley harp carrying a current collector by means of rivets which may be passed through the holes 14. The ends of the members 1, 2 and 13 each have mounted thereon a resilient member 5 preferably of rubber and are held against withdrawal by means of the flanges 6 and 15. To secure these parts together they are inserted in a connecting sleeve 16 preferably of seamless drawn tubing and with the ends 17 turned inwardly. The adjacent ends of the members 1 and 13 are spaced apart and must be maintained apart to prevent vibration being transmitted from the member 13 to the member 1. If desired, a resilient washer or disc 18 may be inserted between the ends of the members 1 and 13.

In order to conduct the current from the part 13 to the part 1, we employ the jumper 8 connected to the parts 1 and 13 by means of screws 9 and 10 respectively.

In Fig. 3 we have shown a standard form of construction comprising the trolley pole 1 broken to show the enlarged portion at the left which is inserted in a trolley base at the car roof. The pole 1 is usually tapered from one end to the other end and is hollow. The upper end is formed with an enlargement to receive the member 13 with the resilient member 5 secured thereto and having a tight fit with the surrounding portion as in the case of Fig. 1. After the insertion of the members 5 and 13, the end 19 is turned inwardly, thus presenting a shoulder to prevent the parts moving longitudinally in one direction and a shoulder 20 prevents the parts moving longitudinally in the other direction. The inner end of the stem 13 may project beyond the end of the member 5 so as to project into the reduced portion of the pole 1 but without contacting therewith and this projection 21 will engage with the pole 1 if the stress applied between the current collector and the trolley wire due to the trolley pole tension is in excess of that which the material 5 will resist, but under normal trolley pole tension or operating conditions the member 21 should not contact with the member 1.

If desired, the inner end of the member 13 need not project beyond the end of the member 5.

The members 1 and 13 are connected by means of the metal jumper 8 and secured to the pole and stem by means of the screws 9 and 10. The trolley harp is secured to the outer end of the stem 13 by means of rivets through the holes 14 or by other means.

It will be noted that there is no direct metallic connection between the parts 1 and 13 whereby vibration can be directly conducted from the member 13 to the member 1.

We prefer to form the member 5 as an integral part of the member 13 which may be done by molding the member 5 directly upon the member 13 with an interposed layer 22 of rubber in intimate union with the surface of the member 13. This layer 22 may be applied as a cement, which will permanently adhere to the surface of the stem 13, or it may be applied by plating, a process used in the rubber art, and over which the material forming the member 5 is applied and vulcanized. The member 5 may be furnished with the annular grooves 11 if desired.

Fig. 4 has a trolley pole of the construction as shown in Fig. 3 but the trolley harp 2 is provided with a stem 23 and the resilient material 5 is applied to the stem 23 by cement or plating 22 or by mechanical interlock. The members 23 and 5 are then inserted in the enlarged portion of the member 1 and the end 19 is then turned inwardly. The member 8 electrically connects the parts 1 and 2.

The enlarged end of the pole 1 as shown in Fig. 3 and which fits into a socket in the trolley base may have secured thereto a layer of resilient material which would then be interposed between the pole 1 and the trolley base socket and hold the metal parts out of contact with each other and prevent the transmission of vibration from the pole to the base. However, due to the weight of the parts and the remoteness of the rubber cushion from the point of applied stress, namely the upper end of the pole, the stress upon the rubber cushion would be considerable. Therefore, we do not prefer such a construction to that shown in Figs. 1-4 inclusive.

The members 1 and 4, or 1 and 13, or 1 and 23 may be manufactured and assembled as a unit, or the member 5 may be integrally secured to the member 4, 13 or 23 and applied to poles already on hand by the user.

The member 5 is enclosed and hence protected from the weather and mechanical injury.

Having described our invention, we claim:—

1. The combination of a current collector, a support member therefor and a hollow-support member for said first support, and the said support positioned in overlapping relation with a sleeve of resilient material between the said support members to prevent sound vibrations passing to the pole and having a surface union with one member and a mechanical interlock with the other member to prevent its separation from said members and a conductor connected to the support to conduct current away from the collector.

2. A combination comprising a hollow trolley pole having one end expanded forming an enlarged receptacle, a current collector and a support therefor having an end projecting into the receptacle and a non-conductor of sound of a yieldable material interposed between the inner wall of the receptacle and the support and maintaining the said parts in a fixed separated relation.

3. The combination of a trolley pole member, a current collector and a support member therefor, a member interposed between the pole and support members and composed of a material to insulate the support from the pole to resist the flow of sound vibrations to the pole and permit a transverse yielding of the support relative to the pole in a plane common to the axis of the pole and of the support, the interposed member having a surface union with one of the other said members.

4. A current collector for attachment to a pole comprising a collector member to engage a conductor and move along the surface thereof, a support for the collector member and a member of resilient rubber secured thereto against slippage through a surface union.

5. The combination of a support member, a current collector and a support member therefor, one of the members having a socket into which projects the other member in lapping relation and a non-conductor of sound composed of yieldable material interposed between the members and holding the members in spaced relation and means interposed between the non-conductor and one of the support members to secure the non-conductor to said support.

6. The combination of a trolley pole, a current collector and a support for the same and a resilient non-conductor of sound interposed between the pole and support, the pole and the support each interlocked with the non-conductor to prevent separation of the parts and to enclose the non-conductor.

7. A collector head comprising a collector member and a support therefor and a sleeve of resilient rubber fixedly secured thereto through vulcanization.

8. A current collector comprising a collector member and a support therefor and a non-conductor of sound in the form of a sleeve non-detachably secured to the support and adapted to receive a trolley pole.

9. The combination with a trolley pole and a support for a current collector of an interposed resilient member to yieldingly maintain the parts out of contact to permit the pole and support to yield relative to each other a predetermined amount under predetermined trolley pole tension and means on each of the parts to engage the other part to prevent the yield of the parts exceeding the predetermined amount.

10. A trolley pole to receive a non-conductor of sound comprising an elongated portion having one end adapted to be secured to a trolley base and having an enlarged receptacle means at the other end formed of the end of the elongated portion to receive therein a non-conductor of sound and having an inwardly turned end edge.

11. A sound destroyer comprising a member composed of resilient rubber and a member composed of a material which is a conductor of sound fixedly secured thereto for attachment to a current collector support.

12. The combination of a trolley pole, a current collector and support therefor mounted upon the end of the pole with a sleeve of resilient rubber interposed between the pole and support to hold the pole and support and having a surface union with one of said parts in a predetermined relation and yieldingly resist relative rotation about a common axis.

13. A trolley device comprising a member having a tubular portion, a second member projecting into said tubular portion and spaced therefrom, and resilient rubber interposed between the members to hold them in separated relation and secured to one of the members through a vulcanized union.

14. A trolley device comprising two metal parts held in a separated relation and against further separation by a resilient rubber member, the rubber member secured to one part by a vulcanized surface union and having a tight engagement with the other part and means on the said other part to prevent its removal from the rubber member.

15. A trolley device comprising two metal parts held in a separated relation and against further separation by a resilient rubber member, the rubber member secured to one part by a surface union and having a tight engagement with the other part.

16. A trolley device comprising a pair of co-operating parts out of direct electrical contact with one another, an interposed member of resilient material arranged between the parts and holding the parts together and means interposed between said interposed member and one of the parts to unite the said member and part.

17. A trolley pole device comprising a pair of co-operating parts out of direct electrical contact with one another, an interposed member of elastic material having an adhering surface union with one part and an interlocked union with the other part to hold the member and parts together against separation.

18. A support for a current collector comprising two metallic member separated and insulated by a body of resilient material, one of the parts secured to the body by a surface union.

19. A supporting member for a trolley pole device comprising an elongated metallic member having a sleeve of resilient deformable material secured to its outer surface by a surface union and extending along said surface for a predetermined distance.

In testimony whereof we affix our signatures.

EDGAR D. MOORE.
FRED R. DIPPMAN.